United States Patent [19]
Metler

[11] Patent Number: 5,209,540
[45] Date of Patent: May 11, 1993

[54] FOLDABLE CARRIER SYSTEM FOR TRANSPORT OF FRANGIBLE SHEET MATERIAL

[75] Inventor: Alois A. Metler, Knoxville, Tenn.

[73] Assignee: A. J. Metler Hauling & Rigging, Inc., Knoxville, Tenn.

[21] Appl. No.: 838,564

[22] Filed: Feb. 19, 1992

[51] Int. Cl.$^5$ ............................................. B60P 3/42
[52] U.S. Cl. ........................................ 296/3; 296/25; 296/182; 105/370; 410/32; 410/54
[58] Field of Search ................ 296/3, 25, 181; 410/2, 410/32, 52, 54; 105/370

[56] References Cited

U.S. PATENT DOCUMENTS

| | | | |
|---|---|---|---|
| 995,884 | 6/1911 | McDowell | 296/25 |
| 1,050,854 | 1/1913 | Sarvis | 296/25 |
| 3,893,705 | 7/1975 | Allen | 410/32 |
| 4,453,761 | 6/1984 | Felburn | 296/43 |
| 4,496,187 | 1/1985 | Pontecorvo | 296/182 |
| 4,527,826 | 7/1985 | O'Neal | 296/3 |
| 4,626,017 | 12/1986 | Robertson | 296/3 |
| 4,635,997 | 1/1987 | Holt et al. | 296/182 |

*Primary Examiner*—Dennis H. Pedder
*Attorney, Agent, or Firm*—Luedeka, Hodges, Neely & Graham

[57] ABSTRACT

A system embodied within an over-the-road trailer or other carrier for use when transporting frangible sheet material, such as sheets of glass, utilizes a frame, a side section hingedly connected to the frame and a frame structure attached to the side section. The frame includes a bed surface having two opposite side edges and a cutout opening out of at least one side edge of the bed surface. The side section includes a bed surface section and is hingedly connected to the frame for pivotal movement relative thereto between a first position at which the bed surface section is positioned within the cutout so that the bed surface and bed surface section collectively provide a bed for the system and a second position at which the bed surface section overlies and faces downwardly upon the bed surface of the frame. The frame structure is attached to the side section for movement therewith between the first and second positions so that when the side section is positioned in its first position, the frame structure is positioned in an out-of-the-way condition for use of the bed of the system and so that when the side section is in its second position, the frame structure extends generally upwardly from the side section for supporting frangible sheet material in a near-vertical orientation for transport.

20 Claims, 4 Drawing Sheets

_Fig. 8_

_Fig. 9_  _Fig. 10_

FOLDABLE CARRIER SYSTEM FOR TRANSPORT OF FRANGIBLE SHEET MATERIAL

BACKGROUND OF THE INVENTION

This invention relates generally to the hauling of frangible sheet material and relates more particularly to the structure of carriers used for hauling such sheet material.

Commonly, sheets of frangible material, such as sheets of glass, are transported in a near-vertical orientation to reduce the likelihood that the sheets will be exposed to undue stress during transport. To this end, carriers used for transporting frangible material sheets are commonly provided with upstanding racks, or A-frames, for supporting the material sheets in the desired orientation.

Heretofore, carriers, such as over-the-road trailers, used for transporting frangible material sheets incorporate A-frame structures against which the sheets may be leaned for transport. However, the A-frame structure of such a carrier typically does not accommodate the use of the carrier for a purpose other than its intended purpose of transporting frangible material sheets. In addition, each of these A-frame structures commonly provides a relatively large frontal area which contributes appreciably to the wind resistance of the carrier when in motion. Therefore, when the carrier is unloaded, an unnecessary expenditure of energy, i.e., fuel, may be required to move the carrier in opposition to the wind resistance generated by its A-frame structure. An example of a carrier, in the form of a trailer, within which such an A-frame structure is incorporated is shown and described in U.S. Pat. No. 4,626,017.

It is an object of the present invention to provide a new and improved carrier system which can be used for transporting frangible sheet material in a substantially upright orientation and, in the alternative, can be used for an alternative purpose.

Another object of the present invention is to provide such a carrier system utilizing an A-frame structure for supporting frangible sheet material and, when not in use, can be folded into a condition for reducing wind resistance on the carrier system when in motion.

Still another object of the present invention is to provide such a carrier system which is uncomplicated in construction and effective in operation.

A further object of the present invention is to provide an over-the-road trailer which can be used for transporting frangible sheet material in a substantially upright orientation and, in the alternative, can be used as a common flatbed trailer.

A still further object of the present invention is to provide such a trailer utilizing an A-frame structure for supporting frangible sheet material and, when not in use, can be folded beneath the bed of the trailer in a stored condition.

SUMMARY OF THE INVENTION

This invention resides in a carrier system which may be selectively used for transporting frangible sheet material in a near-vertical orientation or used as a carrier having a common bed.

The carrier system includes a wheeled frame adapted for movement along a highway including means providing a bed surface having two opposite side edges and a cutout opening out of at least one side edge of the bed surface. A side section providing a bed surface section is hingedly connected to the frame for pivotal movement relative thereto between a first position at which the bed surface section is positioned within the cutout so that the areas of the bed surface and bed surface section contribute to the area of a bed for the carrier system and a second position. The carrier system further includes a frame structure associated with the side section for movement therewith as the side section is moved between its first and second positions so that when the side section is positioned in its first position, the frame structure is positioned in an out-of-the-way condition for use of the bed of the carrier system and so that when the side section is positioned in its second position, the frame structure extends generally upwardly from the side section for supporting frangible sheet material in a near-vertical orientation for transport.

DETAILED DESCRIPTION OF THE ILLUSTRATED EMBODIMENTS

Figure 1:
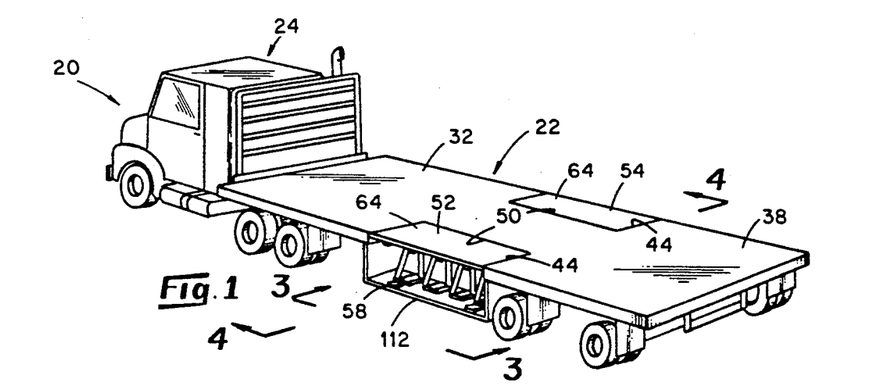
FIG. 1 is a perspective view of an embodiment of a trailer system within which various features of the present invention are incorporated and illustrating the frame structure of the system when positioned in a stored, out-of-the-way condition.
Figure 2:
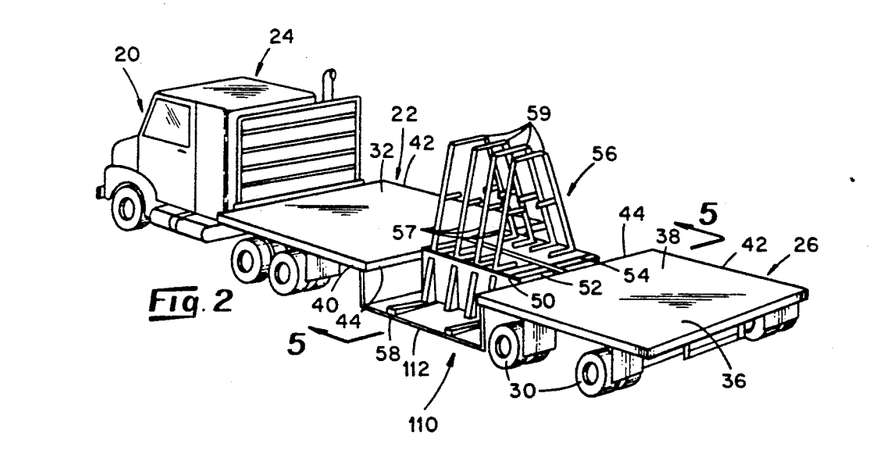
FIG. 2 is a perspective view similar to that of FIG. 1 illustrating the frame structure of the FIG. 1 embodiment when positioned in an upright condition for use.

Turning now to the drawings in greater detail and considering first FIGS. 1 and 2, there is shown an over-the-road trailer rig 20 having a trailer 22 and a tractor 24 attached to the trailer 22 for pulling the trailer 22 along a road. As will be apparent herein, the trailer 22 includes frame components which may be folded between one condition enabling the trailer 22 suitable for use as a carrier upon which sheets of frangible material, such as sheets of glass, may be positioned for transport and another condition rendering the trailer 22 suitable for use as a common flat bed trailer.

Although the features of the present invention are described herein as embodied within an over-the-road trailer, the features of the invention may be embodied within other carrier vehicles of a class commonly used for the transport of frangible material sheets, such as glass sheets. Accordingly, the principles of the present invention may be variously applied.

Figure 3:
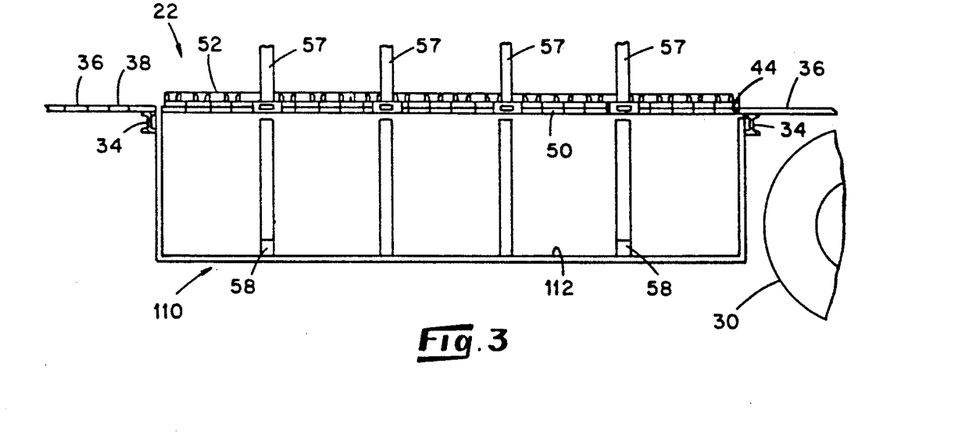
FIG. 3 is a fragmentary side view as viewed along line 3—3 of FIG. 2.
Figure 4:
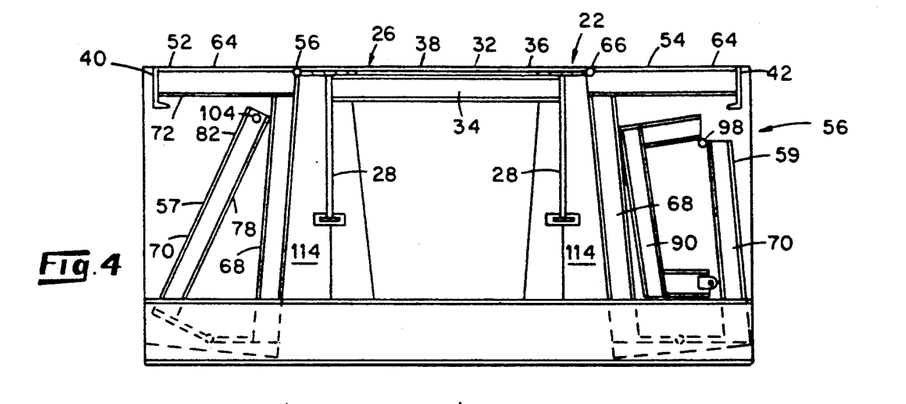
FIG. 4 is a cross-sectional view taken about on line 4—4 of FIG. 1.
Figure 5:
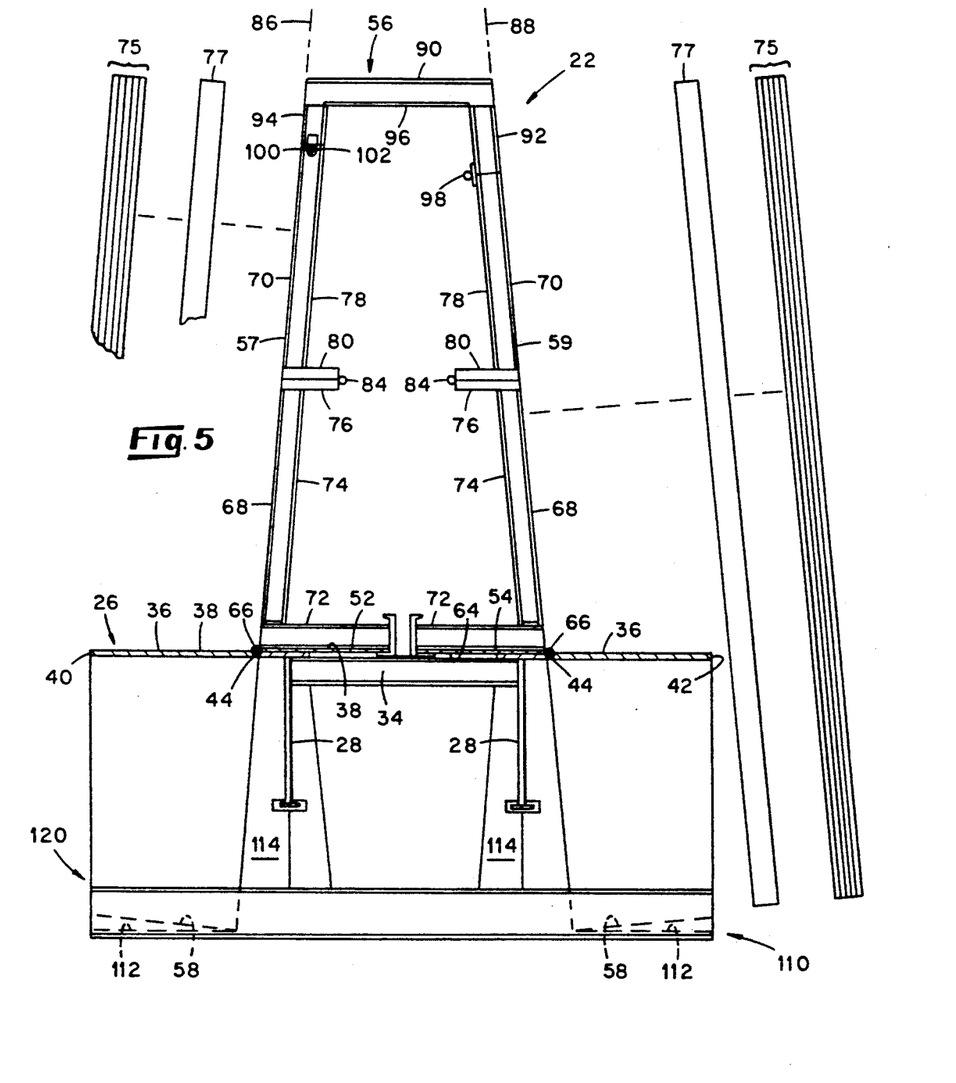
FIG. 5 is a cross-sectional view taken about along line 5—5 of FIG. 1.

As best shown in FIGS. 3–5, the trailer 22 includes a trailer frame 26 including longitudinally-extending I-beams 28 (FIGS. 4 and 5) supported upon wheels 30 and a platform section 32 supported upon the I-beams 28. The platform section 32 includes a plurality of transversely-extending beams 34 and a wooden platform 36 supported upon the I-beams 34 and which provides an upwardly-facing planar surface 38. As will be apparent herein, the upwardly-facing surface 38 provides a major portion of the flat bed surface of the trailer 22 when the trailer components are arranged for use of the trailer 22 as a flat bed carrier. The platform section 32 also includes a pair of opposite side edges 40, 42 extending along the sides of the trailer 22 and a U-shaped cutout 44 (FIG. 2) provided along each side edge 40 or 42 of the platform section 32 so as to open generally away from its corresponding side of the trailer 22. In the depicted embodiment 22, each cutout 44 is provided substantially midway along the length of the corresponding side edge 40 or 42. As best shown in FIG. 1, each U-shaped cutout 44 is bordered by a pair of opposing and parallel laterally-extending edges and a longitudinally-extending edge 50 extending between the lateral edges.

The trailer 22 also includes two side sections 52, 54 which are hingedly connected to the platform section 32 and a frame structure 56 attached to the side sections 52, 54 for movement therewith. Each side section 52 or 54 includes a substantially rectangular platform section hingedly connected along one of its edges to the platform section 32 adjacent the longitudinal edge 50 of a corresponding cutout 44 and has a side face which provides a bed surface section 64. Each side section 52 or 54 is positionable in a first position, as illustrated in FIG. 1, so that its surface section 64 faces upwardly, is co-planar with the plane of the platform surface 38 and substantially fills its corresponding cutout 44. Each side section 52 or 54 is stably supported when positioned in its first, or FIG. 1, position so that the platform surface sections 64 and the surface 38 of the trailer platform 36 collectively provide an expansive support surface enabling the trailer 22 to be used as a common flat bed trailer.

It is a feature of the trailer 22 that each side section 52 or 54 may be pivotally moved from its first, FIG. 1, position through an angular path of movement out of the plane of the platform surface 38 of the platform section 32 to a second position as illustrated in FIG. 2. In the depicted trailer 22, each side section 52 or 54 is in its second position when positioned so that its bed surface section 64 overlies and faces downwardly upon the platform surface 38 as best shown in FIG. 5. To this end, the trailer 22 includes hinges 66 attached between the platform section 32 of the trailer frame 26 adjacent the longitudinal edge 50 of a corresponding cutout 44 and a corresponding side section 52 or 54 adjacent an edge thereof so that the side section 52 or 54 may be moved between its first and second positions as it pivots generally about the longitudinal edge 50 of the corresponding cutout 44.

With reference to FIGS. 2, 4 and 5, the frame structure 56 includes four identical support structures 57 associated with the side section 52 disposed adjacent one side of the trailer 22 and four identical support structures 59 associated with the side section 54 disposed adjacent the other side of the trailer 22. The support structures 57 are regularly spaced along the length of the side section 52 while the support structures 59 are regularly spaced along the length of the side section 54. As will be apparent herein, the support structures 57 of the frame structure 56 collectively define one support plane adjacent one side of the trailer 22 against which sheets of frangible material may be positioned for transport. Similarly, the support structures 59 collectively define another support plane adjacent the other side of the trailer 22 against which sheets of frangible material may be positioned for transport.

As best shown in FIGS. 4 and 5, each support structure 57 includes two support braces 68, 70 which are hingedly connected together for movement between an upright, operative condition as illustrated in FIG. 5 and a folded, stored condition as illustrated in FIG. 4. A first brace section 68 of the support structure 57 has one end which is fixedly attached to the side section 52 so as to extend in the direction opposite the direction in which the bed surface section 64 faces, and the second brace section 70 has one end which is hingedly connected to the end of the first brace section 68 opposite the side section 52.

The first brace section 68 includes a foot member 72 which is attached so as to extend transversely across the underside of the platform section of the side section 52, a post member 74 which extends generally away from the side section 52 and an arm member 76 fixedly joined at one end to the end of the post member 74 opposite the foot member 72 so that the foot member 72 and arm member 76 are generally parallel to one another and extend to one side of the post member 74. Each member of the first brace section 68, as well as the members of the other brace sections described herein, is constructed of a strong, rigid material, such as steel, aluminum or some other metal, and is fixedly attached to its adjacent member with bolts or welds. In the depicted embodiment, each member of the brace sections described herein is I-shaped in cross section.

The second brace section 70 includes a post member 78 and an arm member 80 which is fixedly joined at one end to an end of the post member 78 so that the other end, indicated 82, of the post member 78 extends away from the arm member 80. An opening 104 (FIG. 4) is provided in the end 82 of the post member 78 for a reason apparent herein. The first and second brace sections 68, 70 are hingedly connected to one another with a hinge 84 joining the ends of the arm members 76 and 80 which extend generally away from the corresponding post member 78 or 80. When each support structure 57 is positioned in its folded or stored condition as illustrated in FIG. 4, the first brace section 68 depends generally downwardly from the side section 52 and the second brace sections 70 is positioned adjacent the first brace section 68.

Figures 6, 7:
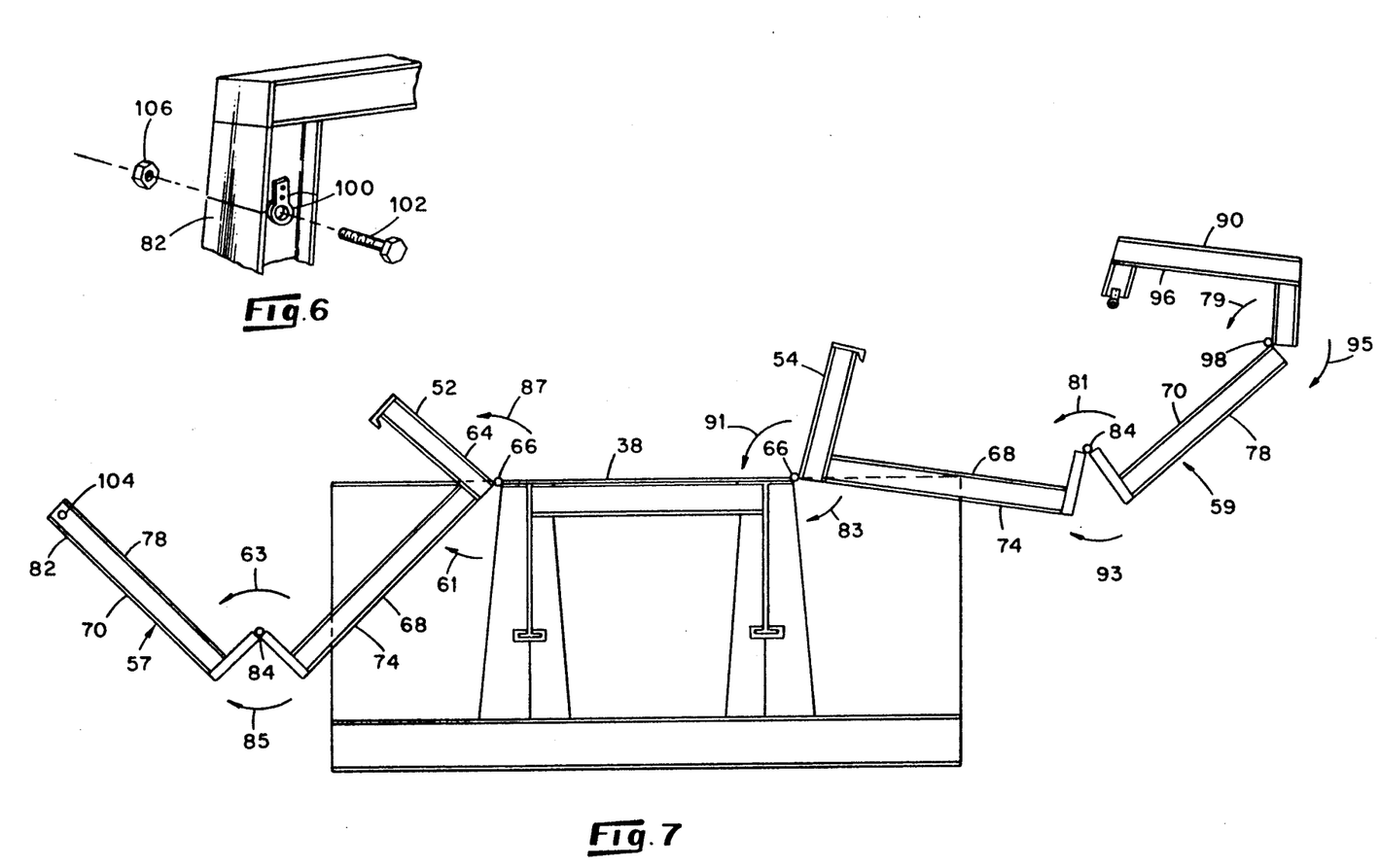
FIG. 6 is a perspective view of a fragment of the FIG. 1 embodiment as shown in FIG. 5.
FIG. 7 is a cross-sectional view similar to that of FIG. 4 illustrating the frame structure with its components positioned between the conditions of FIGS. 4 and 5.

To unfold each support structure 57 from the stored condition of FIG. 4, and with reference to FIG. 7, the first brace section 68 is pivoted about the hinge 66 in the direction of the arrow 61 until the bed surface section 64 of the side section 52 overlies so as to rest upon the surface 38 of the platform section 32, as shown in FIG. 5. With the bed section surface 64 resting upon the platform surface section 38, the post member 74 of the first brace section 68 is supported by so as to extend generally upwardly from the platform surface section 38. The second brace section 70 is also pivoted about the hinge 84 in the direction of the FIG. 7 arrow 63 until the arm member 80 of the second brace section 70 overlies so as to rest upon the arm member 76 of the first brace section 68. With the arm member 80 resting upon the arm member 76 as illustrated in FIG. 5, the post member 78 of the second brace section 70 is supported by so as to align with and extend generally upwardly from the post member 74 of the first brace section 68. With the post members 74, 78 aligned with one another, the side surfaces thereof provide a support plane, indicated 86 in FIG. 5, against which a frangible material sheet may be placed for transport.

The frame structure 59 associated with the side section 54 located on the opposite side of the trailer 22 includes a first brace section 68 and a second brace section 70 having components which are similar to those of the support structure 57 in that they provide somewhat of a mirror image of the support structures 57 associated with the opposite side of the trailer 22. Accordingly, the components of the first and second brace sections 68, 70 of the support structure 59 bear the same reference numerals as those of the support structure 57. Briefly and with reference to FIG. 5, the first brace section 68 of the support structure 59 has a foot member 72 which is fixed to the underside of the platform section of the side section 54 and a post member 74 and an arm member 76 which is fixedly joined to the end of the post member 74 opposite the foot member 72. The second brace 70 of the support structure 59 includes an arm member 80 and a post member 78 fixedly joined to one another, and the arm member 80 is hingedly joined to the arm member 76 of the first brace section 68 for pivotal movement of the second brace section 70 relative to the first brace section 68 about a hinge 84. When positioned in its unfolded, FIG. 5 condition, the post members 74, 78 are aligned with one another and the side surface thereof define a support plane 88 against which frangible sheet material may be positioned for transport.

In addition to the first and second brace sections 68, 70, each support structure 59 also includes a third brace section 90 pivotally joined to the section brace section 70 for movement between a folded condition for storage and an unfolded condition for use and at which the third brace section 90 is connectible to the post member 74 of the support structure 57 positioned on the opposite side of the trailer 22 for joining the support structures 57 and 59 together. As best shown in FIG. 5, the third brace section 90 includes two post sections 92, 94 fixed to opposite ends of a beam 96 so as to extend generally from one side of the beam 96. One post section 92 is connected to the end of the post member 78 of the second brace section 70 by means of a hinge 98, and the other post section 92 supports a pair of rings 100 attached on opposite sides of the section 92. When the third brace section 90 is unfolded to its FIG. 5 operative condition, each post section 92 or 94 is aligned with the corresponding set of post members 74, 78 positioned on opposite sides of the trailer frame 22 so that each post section 92 or 94 contributes to the definition of the support plane 86 or 88 against which sheet material may be positioned for transport.

To unfold each support structure 59 from the stored condition of FIG. 4 and with reference to FIG. 7, the first brace section 68 is pivoted about the hinge 66 in the direction of the arrow 91, the second brace section 70 is pivoted about the hinge 84 in the direction of the arrow 93 and the third brace section 90 is pivoted about the hinge 98 in the direction of the arrow 95 until the sections 68, 70 and 90 assume the operative positions illustrated in FIG. 5. When both of the support structures 57, 59 are positioned in their FIG. 5 operative positions, the openings of the rings 100 are positioned on opposite sides of the post member 78 and aligned with the opening 104 provided in the end 8 of the post member 78 as best shown in FIG. 6. With the ring openings and opening 104 aligned in this manner, the ring openings and a opening 104 are in condition for receiving the shank of a headed pin 102. Upon inserting the pin 102 through the aligned ring openings and opening 104, the support structures 57, 59 are joined together. To prevent inadvertent withdrawal of the pin 102, a nut 106 may be secured about the end of the pin 102 opposite the head end thereof. When joined as aforedescribed, the structures 57, 59 provide a stable arrangement capable of withstanding an appreciable amount of vibratory forces which may normally result from the movement of the trailer 22 along a road.

With reference again to FIG. 5, the trailer 22 also includes support means, generally indicated 110, for supporting the lower edge of frangible material sheets positioned against the support structures 57 and 59 disposed on opposite sides of the trailer frame 26. In the depicted trailer 22, the support means 110 includes a base platform 112 supported on each side of the trailer frame 26 and below the horizontal level of the trailer platform 36. Each base platform 112 is supported from the trailer platform 36 by means of vertically-oriented braces 114 disposed along the length of the trailer frame 26 and having canted side surfaces which contribute to the definition of the support planes 86 and 88 against which sheet material may be positioned for transport. In this connection, each brace 114 is affixed to an I-beam 28 and an edge of a base platform 112. Padded wedge-like foot members 58 are affixed to the base platform 112 in the manner illustrated in FIGS. 2, 4 and 5 so that the upper surface of each member 58 is normal to the corresponding support plane 86 or 88 associated with the support structures 57 or 59.

When sheets of frangible material, indicated 75 in FIG. 5, are positioned upon the trailer 22 for transport, the lower edge of the sheets are positioned upon the padded foot members 58 at a lower elevation than that of the bed surface 38 and one side of the material sheets are leaned against the corresponding support structures 57 or 59 so as to spa at least two of the structures 57 or 59 disposed on opposite sides of the trailer 22. If desired, a layer 77 of plastic material, such as Styrofoam®, may be secured between the support plane 86 or 88 and the material sheets 75 to reduce any likelihood of damage to the sheets 75 during transport. With the material sheets 75 positioned in this arrangement, the sheets are oriented in a near-vertical arrangement and so that the majority of the weight of the sheets 7 is supported by the platform 112 To secure the sheets 75 in this near-vertical arrangement, the sheets 75 may be bound to the corresponding support structures 57 or 59 with, for example, suitable straps.

To fold the support structures 57, 59 into the FIG. 4 stored condition from the FIG. 5 upright condition, the pins 102 (FIGS. 5 and 6) used to join the support structures 57 and 59 together are removed from the aligned openings in the rings 100 and post end 82. Each support structure 59 is then folded into its stored condition by moving its third brace section 90 about the hinge 98 in the direction of the FIG. 7 arrow 79 until the beam 96 is arranged generally alongside the post member 78 of the second brace section 70. The arrangement of the second and third brace section 70, 90 is then folded about the hinge 84 in the direction of the FIG. 7 arrow 81 to a condition at which the first, second and third brace sections 68, 70 and 90 are folded together so that the post members 74, 78 and beam 96 are arranged generally alongside one another. The folded arrangement of brace sections 68, 70 and 90 is then moved about the hinge 66 to position the brace section 68, 70 and 90 in the direction of the FIG. 7 arrow 83 into the folded stored condition of FIG. 4 beneath the level of the trailer platform 36 and so that the side section 54 is moved from its FIG. 5 condition upon the platform 36 to its condition, as illustrated in FIG. 4, at which its platform section surface 64 faces upwardly. With the post members 74 of the first brace section 68 resting against the braces 114, the side section 54 is stably supported in its FIG. 4 condition for loads placed thereupon.

Similarly, each of the support structures 57 may be folded from its FIG. 5 operative condition by moving its second brace section 70 about the hinge 84 in the direction of the FIG. 7 arrow 85 to a condition at which the post member 78 of the second brace section 70 is arranged generally alongside the post member 74 of the first brace section 68. The folded arrangement of brace section 68, 70 is then moved about the hinge 66 in the direction of the FIG. 7 arrow 87 into the folded condition, as illustrated in FIG. 4, beneath the level of the trailer platform 36 and so that the side section 52 is moved from its FIG. 5 condition upon the trailer platform 36 to its FIG. 4 condition at which its platform section surface 60 faces upwardly for a receipt of a load placed thereon. With the folded arrangement of brace sections 68, 70 positioned beneath the level of the trailer platform 36 as illustrated in FIG. 4, the folded brace sections 68, 70 are disposed within the vertical space bordered by the level of the trailer platform 36 and by the base platform 112.

It follows from the foregoing that the trailer 22 may be used for hauling sheets of frangible material, such as sheets of glass, when its support structures 57, 59 positioned in the FIG. 5 upright condition or, in the alternative, as a common flat bed carrier when its support structures 57, 59 are folded into the FIG. 4 stored condition. Another advantage provided by the foldability of the support structures 57, 59 relates to the saving of energy (e.g., fuel) required to pull the trailer 22 along a road while the support structures 57, 59, are unloaded. More specifically, by folding the support structures 57, 59 into the FIG. 4 folded condition, the wind resistance generated by the rig 20 as it is moved along a road is significantly reduced, thereby requiring a smaller expenditure of energy to overcome the wind resistance of the rig 20.

Figure 8:
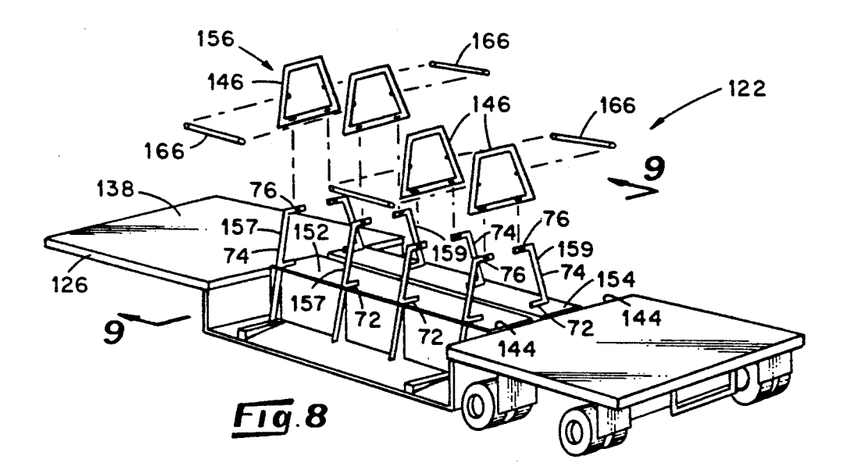
FIG. 8 is a perspective view of an alternative embodiment of a trailer system within which features of the present invention are incorporated, shown exploded.
Figure 9:
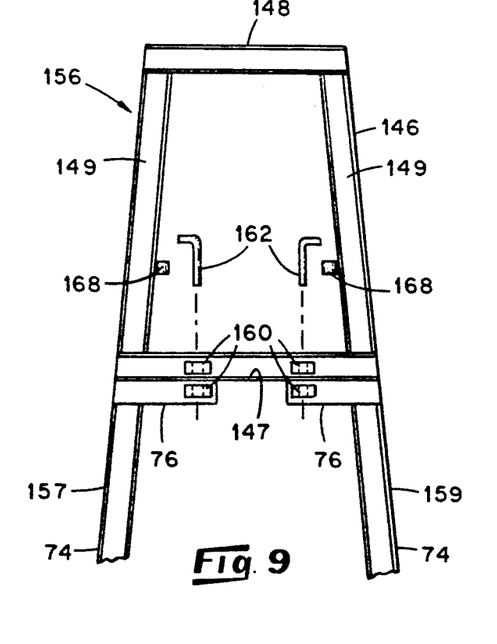
FIG. 9 is a fragmentary view as viewed along line 9—9 of FIG. 8 showing the frame structure when in a partially-assembled condition.
Figure 10:
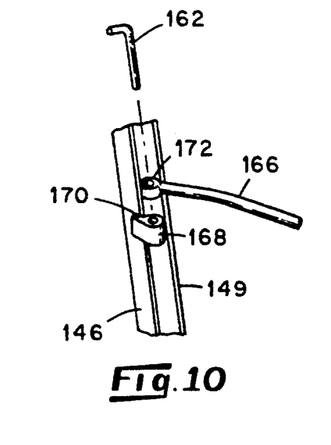
FIG. 10 is a fragmentary perspective view of the FIG. 8 embodiment, shown exploded.

With reference to FIGS. 8–10, there is illustrated another embodiment, indicated 122, of a trailer including a trailer frame 126 having a bed surface 138 and a pair of cutouts 144 opening out of the opposite side edges of the surface 138. A pair of side sections 152, 154 are hingedly connected to the trailer frame 126 for pivotal movement into and out of the cutout 144 as the side sections 52, 54 of the trailer 22 of FIGS. 1–7 are movable into and out of the corresponding cutout 44.

The trailer 122 also include a frame structure 156 having components which are separable from other components of the frame structure 156. To this end, the frame structure 156 includes support structures 157, 159 associated with the side sections 152, 154 and brace structures 146 for spanning and connecting the support structures 157, 159 together.

With reference again to FIG. 8, the frame structure 156 includes four support structures 157 and four support structures 159 regularly spaced along the length of the corresponding side member 152 or 154, and each support structure 157 or 159 includes a foot member 72 which is fixedly joined to the side section 154, a post member 74 extending generally upwardly, as viewed in FIG. 8, from the foot member 74 and an arm member 76 fixedly attached to the end of the post member 74 opposite the foot member 72.

As best shown in FIG. 9, each brace structure 146 is trapezoidal in form and includes opposite and parallel base and top members 147, 148, respectively and two opposite post members 149. When connecting the support structures 157 and 159 together, the brace structure 146 is positioned so that its base member 147 spans the arm members 176 of the support structures 152, 154 and is oriented in an upright condition so that the brace structure 146 is substantially co-planar with the plane formed by the set of support structures 157, 159 upon which the brace structure 146 is positioned. When the brace structure 146 is positioned upon the support structures 157, 159 in the manner illustrated in FIG. 9, each of its post members is generally aligned with the underlying post member of its corresponding support structure 157 or 159 so that one of its side surfaces contributes to the definition of the support plane against which frangible material sheets may be positioned for transport.

To secure each brace structure 146 to its underlying support structures 157, 159, there are associated with the arm members 76 and base member 147 two sets of coupling brackets 160 for receiving the shank headed pins 162. When the brace structure 146 is positioned upon the support structure 157 and 159, the openings provided in each set of coupling brackets 160 are aligned with one another for receiving the shank of a pin 162 inserted endwise therethrough.

To secure each coupled assembly comprised of a corresponding set of support structures 157, 159 and brace structure 146 to an adjacent coupled assembly, lateral braces 166 are connected between adjacent assemblies. To this end, a coupling 168 having an opening 170 is affixed to each post member 149 of the frame structure 156, and each lateral brace 166 has an opening 172 provided at each of its ends. After each set of support structures 157, 159 and brace structures 146 are joined together in a coupled assembly, the lateral braces 166 are positioned between adjacent assemblies 157, 159 so that the opening 172 provided at each end of a brace 166 is aligned with the opening 170 provided in a corresponding coupling 168. With the openings 170, 172 aligned in this manner, the headed pin 162 may be inserted therethrough for securing the brace 166 to each of the adjacent assemblies. It follows that the lateral braces 166 limit movement of each set of the coupled support structures 157, 159 and brace structure 146 out of the plane provided by the coupled assembly.

It will be understood that numerous modifications and substitutions may be had to the aforedescribed embodiments without departing from the spirit of the invention. For example, although each trailer embodiment 22 or 122 has been shown and described as including four support structures 57, 157 or 59, 159 regularly spaced along the length of a corresponding side section, a system in accordance with the broader aspects of this invention may include an alternative number of support structures. Accordingly, the aforedescribed embodiments 22, 122 are intended for the purpose of illustration and not as limitation.

I claim:

1. A carrier system with which frangible sheet material can be transported, said system comprising:
   a wheeled frame adapted for movement along a highway including means providing a bed surface having two opposite side edges and a cutout opening out of at least one side edge of the bed surface;
   a side section providing a bed surface section and which is hingedly connected to the wheeled frame for pivotal movement relative thereto between a first position at which the bed surface section is positioned within the cutout so that the areas of the bed surface and bed surface section contribute to the area of a bed for the carrier system and a second position;
   a frame structure connected to the side section for movement therewith as the side section si moved between its first and second positions so that when the side section is positioned in its first position, the frame structure is positioned in an out-of-the-way condition for use of the bed of the carrier system and so that when the side section is positioned in its second position, the frame structure extends generally upwardly from the bed surface of the wheeled frame for supporting frangible sheet material in a near-vertical orientation for transport.

2. The system as defined in claim 1 wherein the frame structure includes means defining a support plane against which frangible sheet material is positioned when supported by the frame structure.

3. The system as defined in claim 2 wherein the bed surface section of the side section faces in one direction, the frame structure includes at least two brace members which are fixedly attached to the side section so as to extend generally form the side section in a direction opposite the one direction, and the two brace members are arranged substantially parallel to one another and have side surfaces which cooperate to provide the support plane against which frangible sheet material is positionable.

4. The system as defined in claim 3 wherein the two brace members are a first two brace members and the frame structure includes a second two brace members wherein each of the second two brace members is hingedly attached to a corresponding one of the two first brace members adjacent an end thereof opposite the side section for pivotal movement relative to the one first brace member between a firs position at which a corresponding one of the two second brace members is positioned generally alongside the one first brace member and a second position at which the corresponding one of the second two brace members is generally aligned with the one first brace member and has a side surface which is substantially co-planar with the support plane provided by the side surfaces of the first two brace members.

5. The system defined in claim 1 wherein the wheeled frame includes a cutout opening out of each of the opposite sides of the bed surface, the side section is a first side section hingedly connected to the wheeled frame for cooperating with one of the cutouts as the firs side section is moved between its first and second positions, the frame structure includes means connected to the section defining a support plane against which frangible sheet material is positioned for transport when the first side surface is positioned in its second positions and the system further comprises:
   a second side section associated with the other of the cutouts having a bed surface section and which is hingedly connected to the wheeled frame for pivotal movement between a first position at which the bed surface section of the second side section is positioned within the the cutout so as tot contribute to the area of the bed for the carrier system and a second position; and
   the frame structure includes mean connected to the second side section defining a support plane against which frangible sheet material is positioned for transport when the second side surface is positioned in tis second position.

6. The system as defined in claim 5 wherein the means associated with the first side section for defining a support plane is a first support plane-defining means and the means associated with the second side section for defining a support plane is a second support plane-defining means, and the first and second plane-defining means are connectible together when the first and second side sections are positioned in the second positions to maintain the first and second support plane-defining means in position relative to the wheeled frame.

7. The system as defined in claim 6 wherein each of the support plane-defining means includes at least two brace members each having two opposite ends and being fixedly attached to a corresponding side section adjacent one of its ends, the two brace members of each support plane-defining means being arranged substantially parallel to one another and having side surfaces which cooperate to provide a support plane against which frangible sheet material is positionable when the corresponding side section is positioned in the second position.

8. The system as defined in claim 7 wherein the frame structure includes means for connecting a brace member of the first support plane-defining means to a brace member of the second support plane-defining means when the side sections are positioned in the second positions to maintain the brace members in position relative to the wheeled frame.

9. The system as defined in claim 8 wherein the connecting means includes means for joining each brace member of the first support plane-defining means to a corresponding brace member of the second support plane-defining means and includes post members which have side surfaces which are each substantially co-planar with the support plane defined by the first and second support plane-defining means.

10. The system as defined in claim 1 including a support platform associated with the wheeled frame for underlying a lower edge of a frangible material sheet supported by the frame structure so that the lower edge of the material sheet is disposed at a lower elevation than that of the bed surface of the wheeled frame.

11. A trailer system with which frangible sheet material can be transported, said system comprising:
   a trailer frame including means providing a flat bed surface having two opposite side edges and a cutout opening out of at least one side edge of the flat bed surface;
   a side section providing a substantially planar bed surface section facing in one direction and which is hingedly connected to the trailer frame adjacent the cutout for pivotal movement relative to the trailer frame between a first position at which the surface section is positioned within the cutout so that the bed surface section faces upwardly and is substantially co-planar with the bed surface and a second position at which the bed surface section overlies so as to face downwardly upon the flat bed surface of the trailer frame; and a frame structure attached to the side section for movement therewith as the side section is moved between its first and second positions and so as to extend therefrom in a direction opposite the one direction in which the bed surface section of the side section faces so that when the side section is positioned in its first position, the frame structure depends generally downwardly from the side section in an out-of-the way condition and so that when the side section is positioned in its second position, the frame structure extends generally upwardly from the flat bed surface for supporting frangible sheet material in a near-vertical orientation for transport.

12. The system as defined in claim 11 wherein the frame structure includes means defining a support plane against which frangible sheet material is positioned when supported by the frame structure.

13. The system as defined in claim 12 wherein the frame structure includes at least two brace members which are fixedly attached to the side section so as to extend generally from the side section in the direction opposite the direction in which the bed surface section faces, and the two brace members are arranged substantially parallel to one another and have side surfaces which cooperate to provide the support plane against which frangible sheet material is positionable.

14. The system as defined in claim 13 wherein the two brace members are a first two brace members and the frame structure includes a second two brace members wherein each of the second two brace members is hingedly attached to a corresponding one of the two first brace members adjacent an end thereof opposite the side section for pivotal movement relative to the one first brace member between a first position at which a corresponding one of the two second brace members is positioned generally alongside the one first brace member and a second position at which the corresponding one of the second two brace members is generally aligned with the one first brace member and has a side surface which is substantially co-planar with the support plane provided by the side surfaces of the first two brace members.

15. The system as defined in claim 11 wherein the wheeled frame includes a cutout opening out of each of the opposite sides of the bed surface, the side section is a first side section hingedly connected to the trailer frame for cooperating with one of the cutouts as the first side section is moved between its first and second positions, the frame structure includes means associated with the first side section defining a support plane against which frangible sheet material is positioned for transport when the first side surface is positioned in its second position and the system further comprises:

a second side section associated with the other of the cutouts having a bed surface section and which is hingedly connected to the trailer frame for pivotal movement between a first position at which the bed surface section of the second side section is positioned within the other cutout so that the bed surface section of the second side section faces upwardly and is substantially co-planar with the bed surface; and the frame structure includes means associated with the second side section defining a support plane against which frangible sheet material is positioned for transport when the second side surface is positioned in its second position.

16. The system as defined in claim 15 wherein the means associated with the first side section for defining a support plane is a first support plane-defining means and the means associated with the second side section for defining a support plane is a second support plane-defining means, and the first and second plane-defining means are connectible together when the first and second side sections are positioned in the second positions to maintain the first and second support plane-defining means in position relative to the trailer frame.

17. The system as defined in claim 16 wherein each of the support plane-defining means includes at least two brace members each having two opposite ends and being fixedly attached to a corresponding side section adjacent one of its ends, the two brace members of each support plane-defining means being arranged substantially parallel to one another and having side surfaces which cooperate to provide a support plane against which frangible sheet material is positionable when the corresponding side section is positioned in its second position.

18. The system as defined in claim 17 wherein the frame structure includes means for connecting a brace member of the first support plane-defining means to a brace member of the second support plane-defining means when the side sections are positioned in the second positions to maintain the brace members in position relative to the trailer frame.

19. The system as defined in claim 18 wherein the connecting means includes means for joining each brace member of the first support plane-defining means to a corresponding brace member of the second support plane-defining means and includes post members which have side surfaces which are each substantially co-planar with a corresponding one of the support planes defined by the support plane-defining means.

20. The system as defined in claim 11 including a support platform associated with the trailer frame for underlying a lower edge of a frangible material sheet supported by the frame structure so that the lower edge of the material sheet is disposed at a lower elevation than that of the bed surface of the trailer frame.

* * * * *

UNITED STATES PATENT AND TRADEMARK OFFICE
CERTIFICATE OF CORRECTION

PATENT NO. : 5,209,540
DATED : May 11, 1993
INVENTOR(S) : Alois A. Metler

It is certified that error appears in the above-indentified patent and that said Letters Patent is hereby corrected as shown below:

At column 9, line 19, before "section", delete "si" and insert -- is --.

At column 9, line 38, before "generally", delete "form" and insert -- from --.

At column 9, line 51, before "a", delete "firs" and insert -- first --.

At column 9, line 64, before "side", delete "firs" and insert -- first --.

At column 9, line 67, before "section" insert -- first side --.

At column 10, line 1, before "and" delete "positions" and insert -- position --.

At column 10, line 8, before "contribute" delete "tot" and insert -- to --.

Signed and Sealed this

Eleventh Day of January, 1994

Attest:

BRUCE LEHMAN

Attesting Officer

Commissioner of Patents and Trademarks